United States Patent [19]

Tompkins

[11] Patent Number: 4,951,826

[45] Date of Patent: Aug. 28, 1990

[54] COMPACT DISC DISPLAY AND STORAGE BOARD

[76] Inventor: Rodney R. Tompkins, 420 Douglas St., Wayne, Nebr. 68787

[21] Appl. No.: 357,198

[22] Filed: May 26, 1989

[51] Int. Cl.$^5$ ................................................ A47F 7/00
[52] U.S. Cl. ........................................ 211/40; 211/41; 211/71; 211/88; 248/205.2; 312/10
[58] Field of Search .................... 211/41, 71, 87, 88, 211/40; 312/10; 248/205.2; 206/387

[56] References Cited

U.S. PATENT DOCUMENTS

| | | | |
|---|---|---|---|
| 4,673,152 | 6/1987 | Brown | 248/488 X |
| 4,793,480 | 12/1988 | Gelardi et al. | 312/10 X |
| 4,837,953 | 6/1989 | Tannenbaum | 40/124 |
| 4,870,725 | 10/1989 | Dubowik | 248/205.2 X |

Primary Examiner—Robert W. Gibson, Jr.
Attorney, Agent, or Firm—Zarley, McKee, Thomte, Voorhees & Sease

[57] ABSTRACT

A compact disc storage and display board which includes a rigid panel which will support a plurality of compact disc cases. Preferably, a frame is mounted to the panel to give the device a more refined appearance. The frame includes upper and lower edges and a pair of side edges which form a boundary surrounding a display surface. Compact disc cases may be removably connected to the display surface utilizing hook and loop fasteners with one half of the fastener mounted on the rearward face of the compact disc case and the other half of the fastener mounted on the forward surface of the rigid panel. Compact disc cases mounted on the display board may be opened so as to allow access to the compact disc therein. In this fashion, the graphic work on the forward cover of each compact disc case may be displayed within the frame and yet allow access to the compact disc therein.

6 Claims, 2 Drawing Sheets

COMPACT DISC DISPLAY AND STORAGE BOARD

TECHNICAL FIELD

This invention relates generally to a storage device for compact discs, and more specifically to a storage and display board for compact discs which may hung to a wall.

BACKGROUND OF THE INVENTION

With the advent of the compact disc and the compact disc player, the vinyl long-play record industry has largely been replaced with this new technology for recordation and performance of music. The preference of the compact disc over conventional records lies in the smaller dimensions, superior sound quality and more durable materials utilized.

Conventionally, compact discs come in a small storage case which protects the disc when not in use. The compact disc storage case has a hinged front door which pivots to one side to allow removal of the compact disc. The door also serves as a holder for a graphic work displaying the title of the disc and/or the performer. These graphic works are similar to the album covers utilized in the conventional record industry.

The applicant herein has discovered that compact disc cases lend themselves to being conveniently and aesthetically displayed as a wall hanging. In this way, the graphic works on the front of the compact disc cases may be displayed as a decorative feature on a wall. The various cases are removably mounted on the wall hanging so that a variety of artistic effects may be achieved.

One of the problems overcome by the use of a wall hanging to display the compact disc cases, is in the savings of valuable shelf space for storage of the compact discs. Display of the cases on the wall hanging is not only decorative, but allows the owner to quickly scan all of the stored cases for the particular disc desired.

It is therefore a general object of the present invention to provide a new and novel compact disc display and storage board.

A further object of the present invention is to provide a compact disc storage board which may be readily hung from a wall.

Yet another object of the present invention is to provide a storage board in which the compact discs may be easily removed for use on a compact disc player.

A further object of the present invention is to permit an owner to display the graphic works on compact disc cases.

A related object of the present invention is to provide a wall display of compact disc cases which may be conveniently arranged as desired.

A further object of the present invention is to provide an efficient storage device for storing compact discs.

These and other objects will be apparent to those of ordinary skill in the art.

SUMMARY OF THE INVENTION

The compact disc storage and display board of the present invention includes a rigid panel having an optional frame mounted on the forward surface thereof. The frame includes upper and lower edges and a pair of side edges which form a boundary surrounding a display surface. Compact disc cases may be removably connected to the display surface utilizing hook and loop fasteners with one half of the fastener mounted on the rearward face of the compact disc case and the other half of the fastener mounted on the forward surface of the rigid panel. Because conventional compact disc cases have a forward cover which pivots outwardly from a base portion, cases which are mounted on the display board may be opened so as to allow access to the compact disc therein without having to remove the case from the storage board. In this fashion, the graphic work on the forward cover of each compact disc case may be displayed within the frame and yet allow access to the compact disk therein.

BRIEF DESCRIPTION OF THE PREFERRED EMBODIMENT

Figure 1:
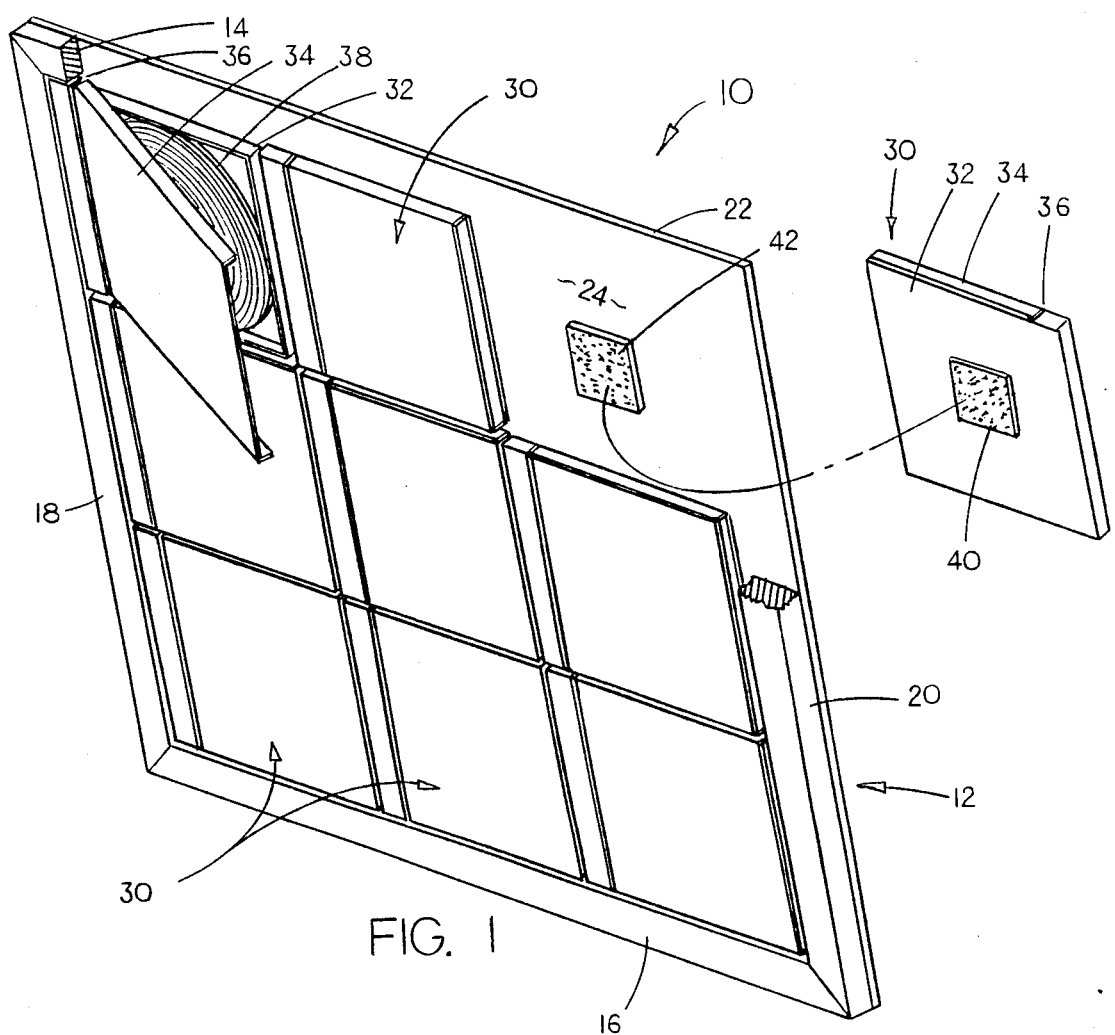
FIG. 1 is a perspective view of the present invention having a number compact disc cases removably mounted thereon.

Referring now to the drawings, in which identical or corresponding parts are identified with the same reference numeral, and more particularly to FIG. 1, the compact disc storage and display board of the present invention is identified generally at 10, and includes a rigid frame 12 having an upper edge 14, a lower edge 16, and a pair of opposing side edges 18 and 20. A rigid panel 22 is mounted to frame 12 to form a base with a forward surface 24 and a rearward surface 26. Edges 14, 16, 18 and 20 of frame 14 are affixed so as to create a framed display area.

Figure 4:
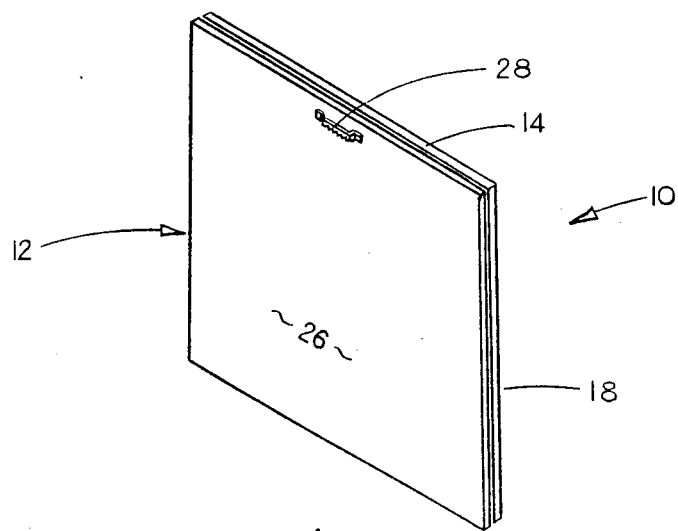
FIG. 4 is a perspective view of the rear of the present invention.

Referring now to FIG. 4, a clip 28 is secured to the rearward surface 26 of frame 12 such that compact disc storage board 10 may be hung on a wall. Edges 14, 16, 18 and 20 provide the storage and display board 10 with the frame which dresses up the overall appearance of the invention.

FIG. 1 shows a board 10 having nine individual compact disc cases 30 removably affixed thereto. Each case 30 includes a generally rectangular base 32 having a front door 34 pivotally connected to base 32 at hinge 36. The compact disc 38 is removably secured within base 32 in a conventional fashion.

Each compact disc case 30 is removably secured to the front surface 24 of rigid panel 22 using a pair of corresponding hook and loop fasteners. The hook portion of the fastener is designated generally at 40 and is secured to the center of the rearward side of base 32 of each compact disc case 30. The loop portion of the fastener 42 is secured to rigid panel forward surface 24 so as to correspond with each hook fastener 40 on each compact disc case 30.

Figure 2:
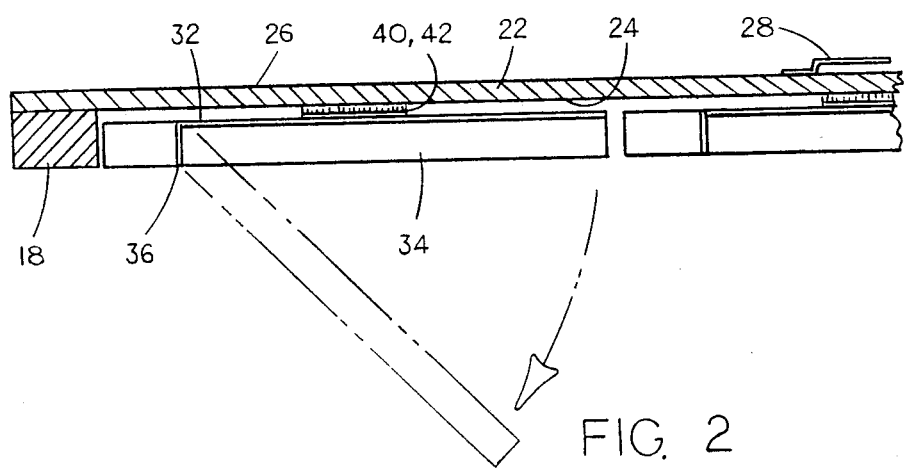
FIG. 2 is a top sectional view through the frame of the support board showing one compact disc case with its door in an open position.
Figure 3:
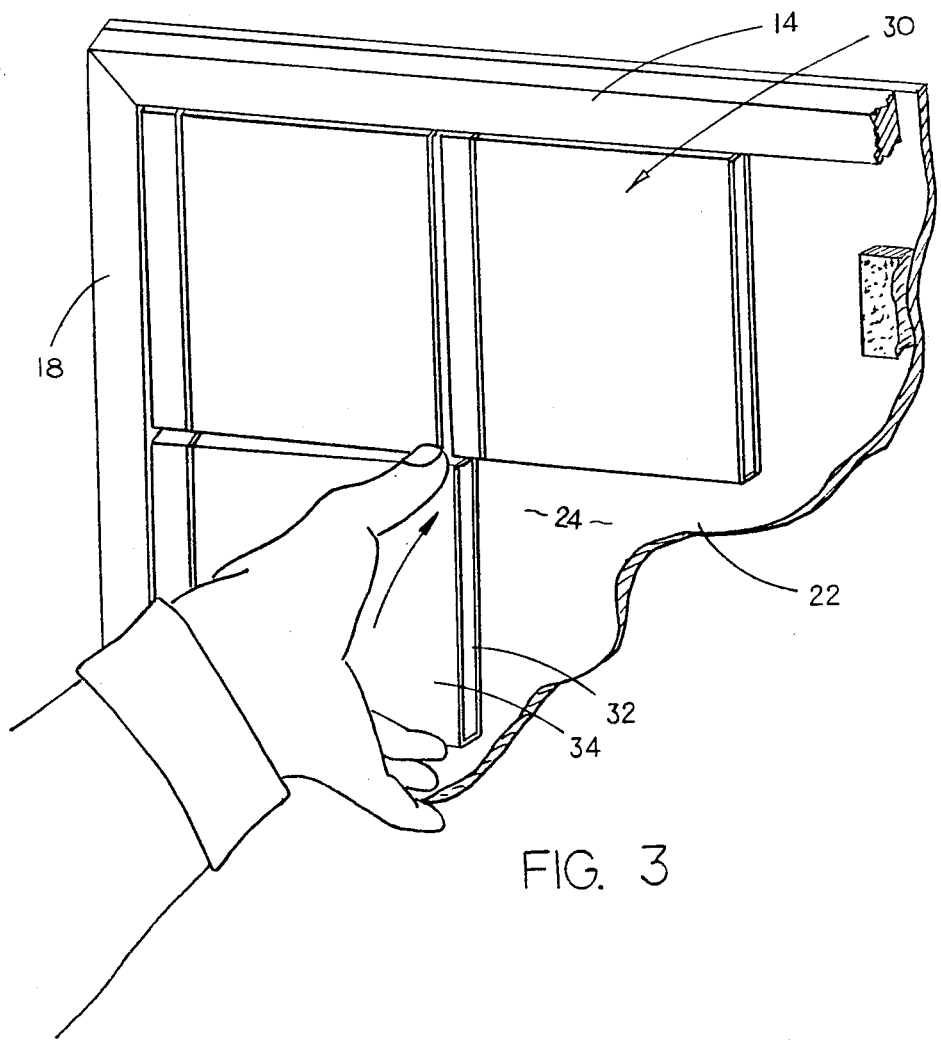
FIG. 3 a perspective view of the present invention, showing a user opening a case.

Hook and loop fasteners 40, 42 have dimensions less than the length and width of base 32, as shown in FIGS. 1 and 2, such that a gap is formed between each compact disc case 30 and the forward surface 24 of rigid panel 20. This is important, so that a user may open the desired compact disc case 30 as shown in FIG. 3. In order to open the compact disc case 30, the side edges of the door 34 must be slightly squeezed as shown in FIG. 3. To accomplish this, the user must slightly push on the edges of each disc case above and below the case to be opened, so that the adjacent cases pivot about their fasteners 40, 42 and allow the side edges of the door 34 to be gripped. Use of the cooperable fastener 40, 42 with the dimensions shown, allows each case 30 to pivot about the fastener.

Whereas the invention has been shown and described in connection with the preferred embodiment thereof, it will be understood that many modifications, substitutions and additions may be made which are within the intended broad scope of the appended claims. For example, it is preferred that a frame be attached to the support board to give the invention a more finished and refined appearance. However, the essence of the invention does not require such a frame. Similarly, the support board may be of a variety of sizes for different arrangements of disc cases, and may be hung on a wall in a variety of ways. Thus, there has been shown and described a new and novel compact disc storage and display board which accomplishes at least all of the above stated objects.

I claim;

1. A compact disc storage and display board, comprising:
   a rigid panel having a forward surface and a rearward surface;
   a plurality of fastener means, each including first and second cooperable halves, said first fastener halves being secured to the forward surface of said panel; and
   at least one operable storage case means having one said second fastener half affixed thereto for selective cooperable fastening to one of said first halves, to thereby selectively fasten said case means to said panel.

2. The compact disc storage and display board of claim 1, further comprising a frame mounted on the forward surface of said panel, and including upper and lower edge portions and opposing side edge portions arranged to form a display area between said frame edge portions.

3. The compact disc storage and display board of claim 1, wherein said at least one operable storage case includes a base portion with said second fastener half thereon, and a forward door pivotally connected to said base portion to allow access into said case.

4. The compact disc storage and display board of claim 3, wherein said forward door includes a pair of depending, opposing side edges, said side edges having means for selectively locking said forward door in a closed position with said base portion.

5. The compact disc storage and display board of claim 4, wherein said second fastener half is mounted generally centrally on said base portion, said fasteners adapted to space said base portion from said panel and adapted to pivotally connect said base portion to said panel, such that said base portion will pivot about aid fastener with respect to the panel.

6. The compact disc storage and display board of claim 1, further comprising means on said panel for selectively hanging the panel on a vertical wall.

* * * * *